United States Patent Office 3,355,980
Patented Dec. 5, 1967

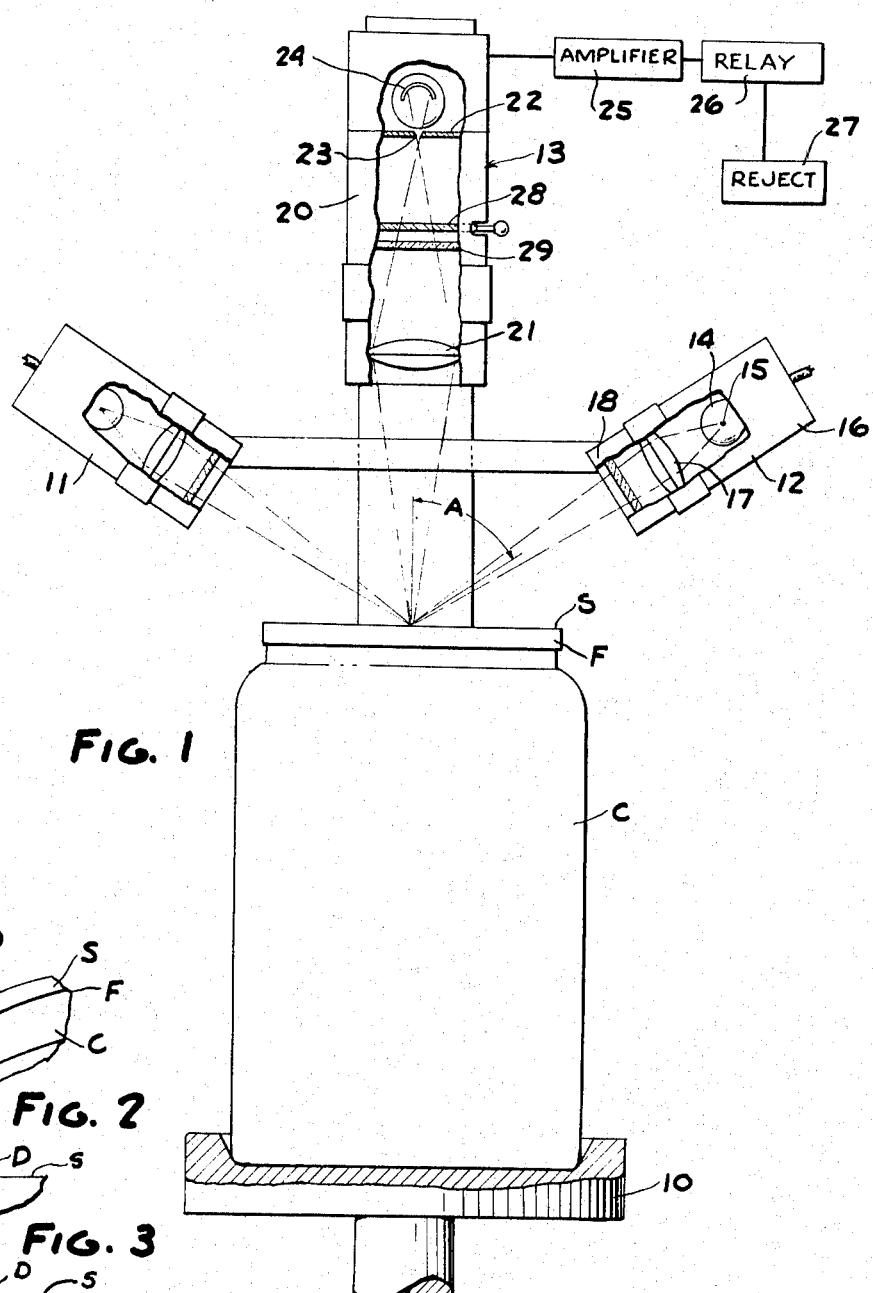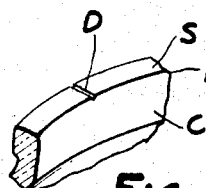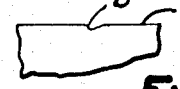

3,355,980
APPARATUS FOR INSPECTING THE RIM OF A BOTTLE OR THE LIKE WHICH EMPLOYS POLARIZED LIGHT AT BREWSTER'S ANGLE
Benny B. Mathias, Toledo, Ohio, assignor to Owens-Illinois, Inc., a corporation of Ohio
Filed Feb. 23, 1962, Ser. No. 174,932
2 Claims. (Cl. 88—14)

This invention relates to inspecting hollow articles for the presence of defects in the rim or finish thereof and particularly for inspecting the top surface of the rim of a hollow glass article to detect the presence of line-over-finish defects.

In the manufacture of hollow articles, such as glass containers, blisters are often formed in the glass. When these blisters are present in the rim or finish of the container, they may interfere with the sealing of the closure. Specifically, when the article is formed as by pressing and blowing or otherwise forming the gob of glass, the blisters become elongated. When the blisters are present, for example, in the top surface of a container which is adapted to be sealed by a closure contacting the top surface, the blister forms a point of incipient leakage of air into the container thereby breaking the seal. It is therefore essential to inspect the containers and discard those which have line-over-finish defects that may interfere with the sealing. At the same time, when the blisters are present beneath the top surface, they will not interfere with the sealing and therefore containers having such blisters may be used.

It is therefore an object of this invention to provide a method and apparatus for inspecting the top surface of the rim of hollow articles for the presence of a line-over-finish defect in the top surface.

It is a further object of the invention to provide such a method and apparatus wherein the line-over-finish defects are quickly and accurately detected.

It is a further object of the invention to provide such a method and apparatus wherein line-over-finish defects in the top surface are detected and illumination of blisters beneath the surface is diminished.

Basically, the invention comprises directing a beam of radiant energy which is polarized so that it has an electric vector perpendicular to the plane of incidence downwardly on the top surface of the container and rotating the container relative to the beam thereby scanning the top surface. A line-over-finish defect in the top surface reflects a portion of the beam upwardly into a device which is sensitive to the radiant energy and has its line of vision forming an angle with the direction of the beam which is substantially equal to Brewster's angle. Because of the polarization and the angular relation, a substantial reduction is made in the amount of radiant energy transmitted into the container. A line-over-finish defect will reflect the light upwardly into the line of vision of the radiant energy sensitive device which, in turn, will energize a reject mechanism. Since a substantial reduction is made in the amount of radiant energy transmitted into the interior of the container, blisters beneath the top surface of the container are not as easily detected.

In the drawings:

FIG. 1 is a part sectional elevation of an apparatus embodying the invention, parts being shown diagrammatically.

FIG. 2 is a fragmentary perspective view of a portion of the rim of the container showing a defect.

FIGS. 3, 4 and 5 are sectional views of the rims of containers showing different types of defects.

Figure 6:
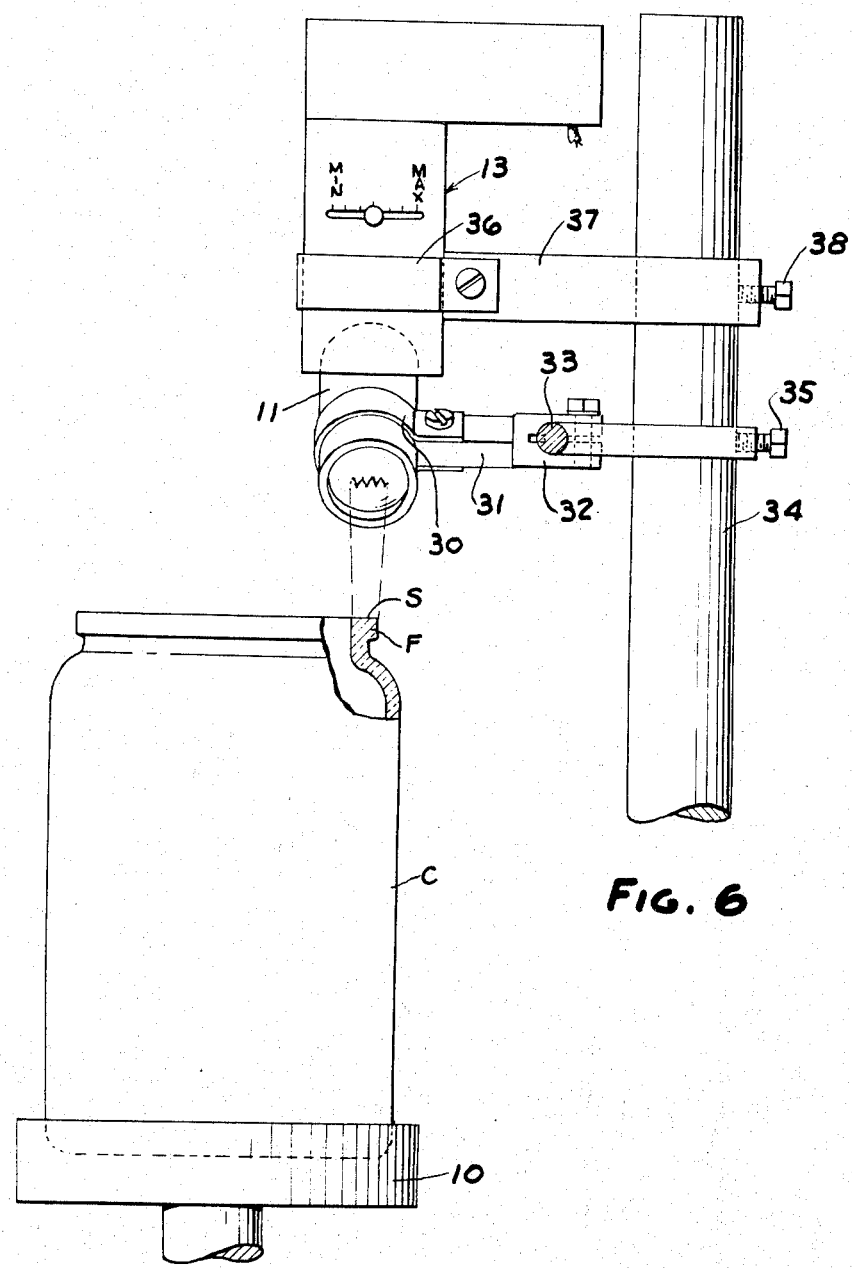
FIG. 6 is a side elevational view of the apparatus shown in FIG. 1, parts being broken away.

Referring to FIGS. 1 and 6, the apparatus comprises a support 10 on which a hollow article, such as a glass container C which is to be inspected, is positioned. The support is adapted to be rotated about the axis of the container C. The container C is of the type having a rim or finish F with a top surface S that cooperates with the closure to form a top seal.

The apparatus includes a pair of sources 11, 12 of radiant energy which direct beams downwardly on the top surface S to illuminate a predetermined area of the surface S. A light-sensitive device 13 is positioned above a portion of the rim of the container C. The defects which are to be detected are of the type shown in FIGS. 2 to 5. As shown in FIG. 2, the defect comprises an elongated opening or break D in the top surface S extending generally radially of the top surface. The defect D may be generally symmetrical as shown in FIG. 3 or asymmetrical as shown in FIGS. 4 and 5.

As the container C is rotated and the beam from one of the sources 11, 12 strikes a defect, a portion of the beam is reflected upwardly to energize the light-sensitive device 13.

Light sources 11, 12 are identical and comprise an incandescent bulb 14 having an elongated filament 15. The bulb when energized directs a beam of light out of housing 16 through lenses 17 and a polarizer 18 in an elongated generally rectangular spot on the top surface S of the container C. The filament 15 is so oriented that the rectangular spot has its greater dimension extending radially of the surface S. The polarizer is oriented so that the electrical component or vector of the beam is perpendicular to the plane of incidence. The plane of incidence is vertical as viewed in FIG. 6.

The light-sensitive device 13 comprises a housing 20 that has its lower end open. A collecting lens 21 is positioned in the housing and is adapted to collect the portion of the beam which is reflected by a defect and focus it against a mask 22 which has an elongated aperture 23 adjacent cell 24, such as a photocell which is sensitive to the radiant energy beam from bulb 14. When an image of the defect appears at the aperture 23, the light cell 24 is caused to emit a signal which may be amplified by an amplifier 25 which, in turn, is caused to energize a relay 26 and actuate a reject mechanism 27. Polarizing filters 28, 29 are provided in the housing 20 to control the intensity of the reflected light and thereby permit adjustment to the sensitivity of the photocell 24.

As shown in FIG. 6, each light source 11, 12 is mounted by a clamp 30 on an arm 31 which, in turn, is provided with a clamp 32 that engages a bar 33 that is fixed to a bracket which is vertically adjustably mounted on a vertical shaft 34 by a set screw 35. The light-sensitive device 13 is supported by a clamp 36 on clamp 37 that is vertically adjustably mounted on shaft 34 by a set screw 38.

The light sources 11, 12 are mounted in such a position that the beams which are directed on the surface S lie in substantially the same vertical plane and are focused on the same point on the surface of the container. The light-sensitive device 13 is positioned in such a manner that its line of vision extends vertically downwardly lying in the same plane as the beams from the source 11, 12 and forming an angle A with the beams substantially equal to Brewster's angle. As is well-known in optics, in the case of a glass container C, this angle A is 57 degrees. By this arrangement, the light striking the surface S has its electrical vector perpendicular to the plane of incidence of the beam and will, therefore, penetrate the surface to a minimum degree in accordance with the well-known Brewster's law so that substantially less light will enter within the finish F. Accordingly, any defects below the surface S will not cause as strong a reflection of any light and will, in turn, reduce the tendency toward false rejection of the container C.

In practice, a container C is placed on the support 10 and the support is rotated. Depending upon the nature of the defect, light will be reflected upwardly from one or both of the light beams, collected by the lens 21 and focused in an image in the plane of the mask 22. Since the spot of light from each light source 11, 12 is elongated radially, the entire surface of the finish is scanned. If a defect is present, the photocell 24 is energized creating a signal which is amplified by amplifier 25 and, in turn, energizes a relay that actuates the reject mechanism 27 to eject the container from the support 10. Alternatively, a time delay may be energized causing a reject mechanism to be operated after the container C has been removed from the support 10 and placed on a conveyor or other support at which the reject mechanism is positioned.

The use of two light sources 11, 12 insures that not only symmetrical defects, such as shown in FIG. 3, but, also, asymmetrical defects, such as shown in FIGS. 4 and 5, will be detected.

Since the beam of radiant energy is polarized in such a fashion that substantially reduced light is permitted to penetrate into the finish F, any defects below the surface S will reduce the cause of rejection of the container C. Accordingly, the apparatus will provide for rejection only of containers which have defects which will interfere with the sealing of a closure with the top surface S of the container C.

I claim:

1. An apparatus for inspecting the surface of the circular rim of a hollow article of translucent material for line-over-finish defects in the surface which comprises means for supporting the article with the axis of the rim generally vertical, means for directing a beam of radiant energy downwardly onto the surface of the rim of the article at an angle to the vertical substantially equal to Brewster's angle, means for focusing said beam at a spot on said rim, means for polarizing said light beam such that the electrical vector is perpendicular to the plane of incidence, light-sensitive means, means for supporting said light-sensitive means on an axis parallel to said rim axis with its line of vision lying in the plane of incidence intersecting said spot on said rim means for causing relative movement between said article and said beam to scan the rim of the article, whereby a line-over-finish defect in the top surface causes a portion of the light beam to be reflected toward the light-sensitive means.

2. The combination set forth in claim 1 including a second source of radiant energy, means for supporting said second light source so that the beam therefrom lies in the same plane as that containing the line of vision of said light-sensitive device and said first beam and is directed against the surface of the container at an angle to the vertical substantially equal to Brewster's angle, means for focusing said light beam in a spot so that it intersects said first beam on substantially the same area as the first beam, means for polarizing said second beam so that it has an electrical vector perpendicular to the plane of incidence of said first and second beam, whereby a line-over-finish defect will cause a portion of at least one of the beams to be reflected toward the light-sensitive means.

References Cited

UNITED STATES PATENTS

| 1,812,294 | 6/1931 | Hohn | 88—14 X |
| 2,593,127 | 4/1952 | Fedorchak | 88—14 |
| 2,726,173 | 12/1955 | Margin | 250—225 |
| 2,866,375 | 12/1958 | Wells et al. | 88—14 |
| 2,902,151 | 9/1959 | Miles et al. | 88—65 |
| 2,947,212 | 8/1960 | Woods | 88—14 |
| 3,021,754 | 2/1962 | Ross | 88—14 |
| 3,085,160 | 4/1963 | Dahms | 88—14 X |
| 3,176,842 | 4/1965 | Fry | 88—14 |

OTHER REFERENCES

Fedorchak shows an article rotating arrangement and the use of an apertured slot in front of a light sensitive element.

JEWELL H. PEDERSEN, *Primary Examiner.*

T. L. HUDSON, O. B. CHEW, *Assistant Examiners.*